United States Patent [19]

Uga

[11] Patent Number: 4,757,550
[45] Date of Patent: Jul. 12, 1988

[54] AUTOMATIC ACCURATE ALIGNMENT SYSTEM

[75] Inventor: Masanori Uga, Hachioji, Japan

[73] Assignee: Disco Abrasive Systems, Ltd., Tokyo, Japan

[21] Appl. No.: 732,219

[22] Filed: May 9, 1985

[30] Foreign Application Priority Data

May 21, 1984 [JP] Japan .................. 59-100658

[51] Int. Cl.⁴ ............................................. G06K 9/58
[52] U.S. Cl. ......................................... 382/8; 382/48; 358/101
[58] Field of Search ...................... 382/8, 48; 358/107, 358/106, 101; 356/394, 400, 401; 350/502, 511, 514, 519

[56] References Cited

U.S. PATENT DOCUMENTS

| | | | |
|---|---|---|---|
| 3,450,480 | 6/1969 | Chitayat | 350/514 |
| 3,895,854 | 7/1975 | Ziffer | 350/571 |
| 4,019,173 | 4/1977 | Kono | 382/46 |
| 4,244,029 | 1/1981 | Hogan et al. | 382/34 |
| 4,291,334 | 9/1981 | Mese et al. | 358/101 |
| 4,310,850 | 1/1982 | Casler, Jr. | 358/107 |
| 4,440,475 | 4/1984 | Colliaux | 350/502 |
| 4,530,604 | 7/1985 | Okutsu et al. | 356/400 |
| 4,597,644 | 7/1986 | Schindl | 350/574 |
| 4,618,938 | 10/1986 | Sandland | 358/106 |
| 4,625,330 | 11/1986 | Higgins | 382/50 |
| 4,672,557 | 6/1987 | Tamura | 250/548 |

Primary Examiner—Leo H. Boudreau
Assistant Examiner—A. Anne Skinner
Attorney, Agent, or Firm—Beveridge, DeGrandi & Weilacher

[57] ABSTRACT

An automatic accurate alignment system for positioning an object to be worked which has a certain pattern on its surface at a required position. The system performs primary positioning of the object to be worked on the basis of low magnification pattern matching with respect to at least a part of the image of the object magnified at a relatively low magnification. Thereafter, the system performs secondary positioning of the object to be worked on the basis of high magnification pattern matching with respect to at least a part of the image of the object magnified at a relatively high magnification.

10 Claims, 5 Drawing Sheets

FIG. 1
FIG. 2
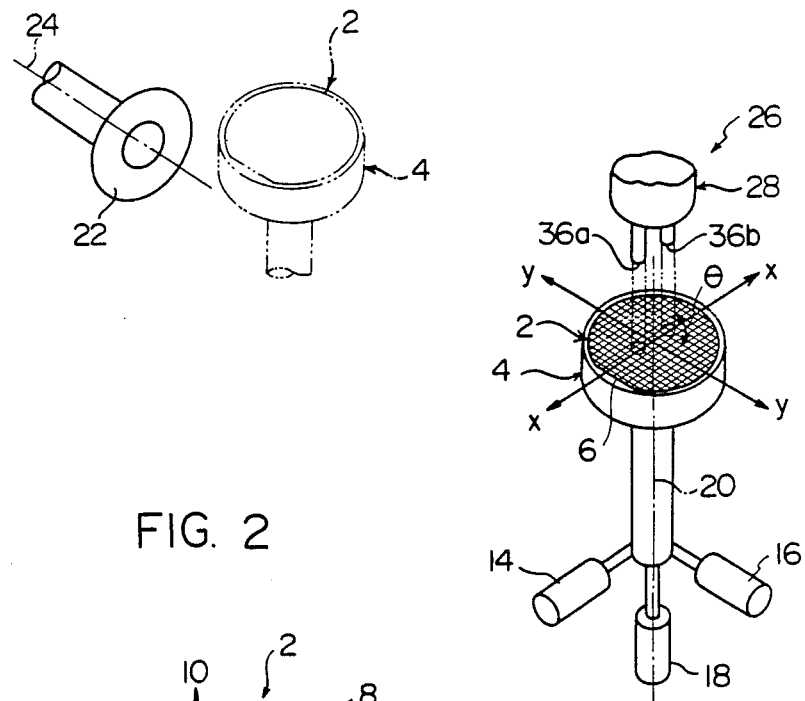
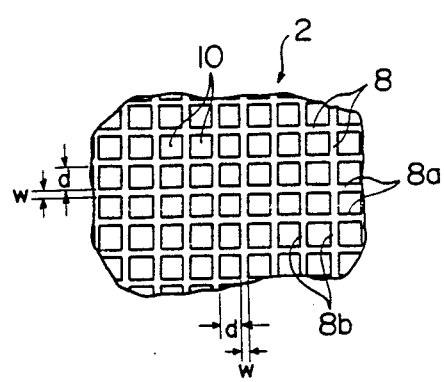

AUTOMATIC ACCURATE ALIGNMENT SYSTEM

FIELD OF THE INVENTION

This invention relates to an automatic accurate alignment system for positioning at a required position an object to be worked which has a certain pattern on its surface, particularly a semiconductor wafer having a plurality of straight-line areas arranged in a lattice pattern on its surface and a circuit pattern applied to each of a plurality of rectangular areas defined by these straight-line areas.

DESCRIPTION OF THE PRIOR ART

As is well known, in the production of semiconductor devices, the surface of a nearly disc-like semiconductor wafer is divided into a plurality of rectangular areas by a plurality of straight-line areas (these straight-line areas are generally called streets) with predetermined widths which are arranged in a lattice pattern, and a circuit pattern is applied to each of these rectangular areas. Thereafter, the semiconductor wafer is cut at these straight-line areas to separate the individual rectangular areas having a circuit pattern applied thereto. (These separated rectangular areas are generally called chips.) It is important that cutting of the semiconductor wafer should be carried out fully accurately at the aforesaid straight-line areas. The width of each of the straight-line areas is very narrow, and is generally about several tens of μm. Hence, when such a semiconductor wafer is to be cut by a cutting means such as a diamond blade, it is necessary to align the semiconductor wafer extremely accurately with respect to the cutting means.

Automatic accurate alignment systems of various types have already been proposed and come into commercial acceptance to position a semiconductor wafer fully precisely at a required position for cutting purposes or otherwise. Such automatic accurate alignment systems are generally adapted to detect fully accurately the relative positions of the straight-line areas existing on the surface of a semiconductor wafer held by a holding means and move the holding means on the basis of the detected positions thereby setting the semiconductor wafer at the required position. A pattern matching method is generally utilized for detecting the relative positions of the straight-line areas in such automatic accurate alignment systems. It involves memorizing the pattern of a specified characteristic area, i.e. the key pattern, on the surface of a semiconductor wafer located at a predetermined position, and the position of the key pattern, and detecting the same pattern as the above pattern on the surface of the semiconductor wafer to be aligned, thereby detecting the relative position of a straight-line area.

The conventional automatic accurate alignment systems utilizing the pattern matching method, however, have the following defect or problem to be solved. In order to align a semiconductor wafer fully accurately, it is necessary to detect the relative position of the straight-line area fully accurately. Accordingly, it is necessary to magnify the image of the surface of the semiconductor wafer at a relatively high magnification, for example, about 7.5 to 30 times and to carry out pattern matching for detecting the same pattern as the key pattern in this magnified image. The area to be searched for detecting the same pattern as the key pattern is multiplied according to the magnification of the image of the surface of the semiconductor wafer. Hence, if the pattern matching is carried out with respect to a magnified image at a relatively high magnification, a considerably long period of time is required, and this becomes an obstacle to increasing of the speed of such an operation as cutting in the step of processing the semiconductor wafer. On the other hand, if the magnification of the image is lowered in order to decrease the time required for carrying out the pattern matching, as is easily understood, the accuracy of the detection of the relative position of the straight-line area is lowered and the accuracy of the alignment of the semiconductor wafer exceeds a tolerance limit.

SUMMARY OF THE INVENTION

It is a primary object of this invention to provide an improved automatic accurate alignment system which can position at a required position an object to be worked such as a semiconductor wafer fully rapidly and fully accurately.

It has now been found surprisingly as a result of extensive investigations of the present inventor that if performing low magnification pattern matching with respect to an image at a relatively low magnification of the surface of an object to be worked and performing primary positioning on the basis of this low magnification pattern matching, and thereafter performing high magnification pattern matching with respect to an image at a relatively high magnification of the surface of the object to be worked and performing secondary positioning on the basis of this high magnification pattern matching, the time required for the high magnification pattern matching can be remarkably shortened by the primary positioning and the low accuracy in the primary positioning can be compensated by the secondary positioning to thus position the object to be worked at a required position fully rapidly and fully accurately.

According to this invention, there is provided an automatic accurate alignment system for positioning at a required position an object to be worked which has a certain pattern on its surface, said system comprising holding means for holding the object to be worked, moving means for moving the holding means, camera means for taking at least a part of the image of the surface of the object held on the holding means and outputting analog signals showing the densities of x-y matrix arrayed pixels, optical means for projecting at least a part of the image of the surface of the object held on the holding means at two magnifications of a relatively low magnification and a relatively high magnification, an image frame memory for memorizing signals corresponding to the analog signals outputted by the camera means, a key pattern memory for memorizing a signal showing a low magnification key pattern corresponding to at least one specified area in the image projected to the camera means at the relatively low magnification and a signal showing the position of the low magnification key pattern, and a signal showing a high magnification key pattern corresponding to at least one specified area in the image projected to the camera means at the relatively high magnification and a signal showing the position of the high magnification key pattern when the object to be worked is located at a predetermined position, pattern matching means for performing low magnification pattern matching for detecting the same pattern as the low magnification key pattern in the image projected to the camera means at the relatively low magnification and high magnification pattern matching for detecting the same pattern as the high magnification key pattern in the image projected to the camera means at the relatively high magnification on the basis of the signals stored in the image frame memory and the signals stored in the key pattern memory, and movement control means for primarily positioning the object held on the holding means by actuating the moving means on the basis of the low magnification pattern matching by the pattern matching means, and thereafter secondarily positioning the object held on the holding means by actuating the moving means on the basis of the high magnification pattern matching by the pattern matching means.

BRIEF DESCRIPTION OF THE DRAWINGS

FIG. 1 is a simplified perspective view schematically showing a part of a semiconductor wafer cutting apparatus equipped with one embodiment of the automatic accurate alignment system constructed in accordance with this invention;

FIG. 2 is a partial top plan view showing a part of the surface of a typical semiconductor wafer;

DETAILED DESCRIPTION OF PREFERRED EMBODIMENTS

Figure 3:
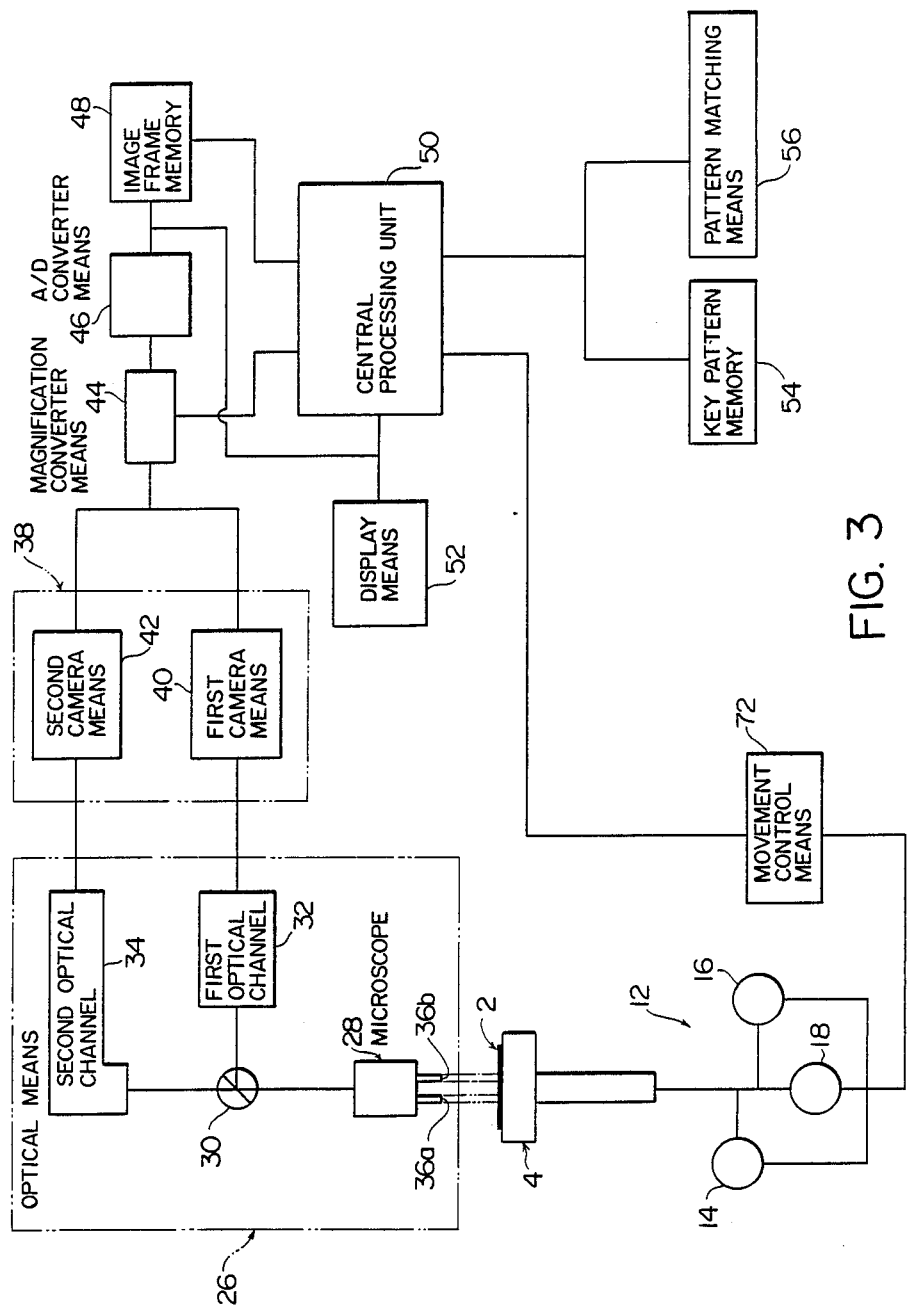
FIG. 3 is a block diagram showing one embodiment of the automatic accurate alignment system constructed in accordance with this invention.

Now, referring to the accompanying drawings, one embodiment of the automatic accurate alignment system constructed in accordance with this invention will be described in detail.

FIG. 1 schematically shows a part of a semiconductor wafer cutting apparatus equipped with one embodiment of the automatic accurate alignment system constructed in accordance with this invention. A semiconductor wafer 2 to be cut is supplied by a suitable supply means (not shown) of a type known per se and placed on a holding means 4. At this time, the wafer 2 is placed on the holding means 4, not fully accurately but within a certain range of errors, for example, by utilizing an orientation flat 6 present in the wafer 2 (or, if the wafer 2 is mounted to a suitable frame with an adhesive tape, by utilizing a notch or the like for positioning formed on the frame). In more detail, as shown in FIG. 2, a plurality of straight-line areas 8 arranged in a lattice pattern exist on the surface of the wafer 2. These straight-line areas 8, or known in the art as streets, are arranged at a predetermined distance d from each other with a predetermined width w. The width of a straight-line area 8a extending in a given direction does not have to be always substantially equal to that of a straight-line area 8b extending in a direction perpendicular to the given direction, but the width of any of these streets is generally on the order of several tens of μm. Furthermore, the distance between the adjoining straight-line areas 8a extending in the given direction needs not to be always equal to that between the adjoining straight-line areas 8b extending in a direction perpendicular to the given direction. Thus, in an ordinary wafer 2, a plurality of rectangular areas 10 are defined by the straight-line areas 8 (8a and 8b). A required circuit pattern is applied to these rectangular areas 10. By utilizing the orientation flat 6, the wafer 2 is placed on the holding means 4 such that either the straight-line areas 8a or the straight-line areas 8b (the straight-line areas 8a in the illustrated embodiment) are within an inclination angle range of, for example, about ±1.5 to ±3.0 degrees to a predetermined reference direction, i.e., the x-direction (FIG. 1).

Further, with reference to FIG. 1, the holding means 4 which may be of a known type surely holds the wafer 2 onto its surface by vacuum attraction, etc. The holding means 4 is mounted by a suitable supporting mechanism (not shown) so that it can move freely in the x-, y- and θ-directions. A moving means 12 is drivingly connected to the holding means 4 to move it fully precisely in a required manner. In the illustrated embodiment, the moving means 12 is comprised of an x-direction moving source 14, a y-direction moving source 16 and a θ-direction moving source 18. The x-direction moving source 14 conveniently constructed of a pulse motor, when actuated, moves the holding means 4 a predetermined distance in the x-direction with an accuracy of, for example, about 1 μm. The y-direction moving means conveniently constructed of a pulse motor, when actuated, moves the holding means a predetermined distance in the y-direction, i.e. a direction perpendicular to the x-direction, with an accuracy of, for example, about 1 μm. The θ-direction moving source 18 which is likewise constructed conveniently of a pulse motor moves the holding means 4 by a given angle, namely rotates the holding means 4 about its central axis 20, with an accuracy of, for example, 0.0015° when it is actuated. If desired, instead of mounting the holding means 4 so that it can move freely in the x-direction and providing the holding means 4 with the x-direction moving source 14, it is possible to mount a microscope of an optical means to be described to that it can move freely in the x-direction and provide the microscope with an x-direction moving source.

A rotating blade 22 preferably formed of bonded diamond abrasive is provided in the illustrated semiconductor wafer cutting apparatus. The rotating blade 22 constituting wafer cutting means is mounted such that it can freely rotate about the central axis 24 which is substantially parallel to the y-direction, and can freely move in the x-direction. It is rotated at a predetermined speed by a suitable drive source (not shown) such as an AC motor, and is reciprocated in the x-direction at a predetermined speed by a suitable drive source (not shown) such as a DC motor.

In the illustrated semiconductor wafer cutting apparatus, the wafer 2 is placed on the holding means 4 by the supply means (not shown) while the holding means 4 exists in a supply and discharge zone which corresponds to the position shown by a solid line in FIG. 1 or its vicinity. Then, as will be stated in detail hereinafter, the position of the holding means 4 is finely adjusted so that the wafer 2 held on the holding means 4 is aligned fully accurately at a predetermined position with respect to the rotating blade 22. Then, the holding means 4 is advanced a predetermined distance in the y-direction to position the holding means 4 and the wafer 2 held on its upper surface at a cutting start zone adjacent to the rotating blade 22 as shown by chain lines in FIG. 1. Thereafter, while the rotating blade 22 is rotated, a cutting movement in the x-direction by which the wafer 2 is put in condition for undergoing the action of the blade 22 being rotated, and a so-called index movement by which the holding means 4 is moved in the y-direction by an amount corresponding to the distance d+w (FIG. 2) between the adjoining straight-line areas 8 existing on the surface of the wafer 2 are alternately effected. As a result, the wafer 2 is cut along the straight-line areas 8b (or 8a) existing on its surface. Subsequently, the holding means 4 is moved by an angle of 90 degrees in the θ-direction about the central axis 20, and then the cutting movement and the index movement are performed alternately to cut the wafer 2 along the straight-line areas 8a (or 8b) existing on its surface. The holding means 4 is then moved backward a predetermined distance in the y-direction and returned to the supply and discharge zone. The cut wafer 2 is discharged from the holding means 4 by a suitable discharge means (not shown) which may be of any type known per se, and the next wafer 2 is placed on the holding means 4 by the supply means (not shown). As is well known to those skilled in the art, the cutting of the wafer 2 by the rotating blade 22 is performed not over the entire thickness of the wafer 2 but in such a manner as to leave a small non-cut thickness, whereby the rectangular areas 10 (FIG. 2) can be prevented from being completely separated from each other (in which case subsequent application of some force breaks the remaining non-cut portion to separate the rectangular areas 10 completely and form chips). Alternatively, an adhesive tape may be applied in advance to the back surface of the wafer 2 so that even when the wafer 2 is cut over its entire thickness, the rectangular areas 10 will not be separated from each other (in which case subsequent peeling of the adhesive tape results in complete separation of the rectangular areas and formation of chips).

With reference to FIG. 3 as well as FIG. 1, an optical means shown generally by a numeral 26 is provided in connection with the holding means 4 and the wafer 2 held on its surface when the holding means 4 exists in the supply and discharge zone. The illustrated optical means 26 includes a microscope 28, a light dividing means 30, a first optical channel 32 and a second optical channel 34. The microscope 28 of a relatively low magnification of, for example, 1.5 to 5 times is constructed of a binocular microscope having two light-incoming openings 36a and 36b spaced from each other a suitable distance of, for example, 40 mm to 55 mm in the x-direction. Hence, the images of two portions of the surface of the wafer 2 on the holding means 4 which are spaced from each other in the x-direction by a predetermined distance are inputted into the microscope 28 through the light-incoming openings 36a and 36b and sent out of the microscope 28 as split images. The light sent out of the microscope 28 is divided into two lights by means of the light dividing means 30 which can be constructed of a suitable means such as a half-mirror. One light, through the first optical channel 32, and the other light, through the second optical channel 34, are projected to a camera means 38. (The camera means 38 will be further described hereinafter). The first optical channel 32 projects the image sent out of the microscope 28 to the camera means 38 as it is without further magnifying it. Hence, the image of the surface of the wafer 2 projected to the camera means 38 through the first optical channel 32 is a magnified image of a relatively low magnification, for example, 1.5 to 5 times. If desired, the image of the surface of the wafer 2 projected to the camera means 38 through the first optical channel 32 can be an equal or somewhat reduced image. Therefore, the term, 'a relatively low magnification' used in this specification includes not only a low magnification but also an equal or a reduction to some extent. On the other hand, the second optical channel 34 includes magnifying lenses having a magnification of, for example, 5 to 10 times, further magnifies the image sent out of the microscope 28 and projects it to the camera means 38. Hence, the image of the surface of the wafer 2 projected to the camera means 38 through the second optical channel 34 is a magnified image of a relatively high magnification, for example, 7.5 to 30 times.

The camera means 38 in the illustrated embodiment includes a first camera means 40 optically connected to the first optical channel 32 and a second camera means 42 optically connected to the second optical channel 34. Each of the first and second camera means 40 and 42 may be of any type which can output an analog signal showing the density of x-y matrix arranged pixels according to the images projected. Preferably, it is constructed of a solid-state camera, particularly a solid camera having a plurality of image sensor elements such as CCDs, CPDs or MOSs arranged in an x-y matrix. In the illustrated embodiment, each of the first and second camera means 40 and 42 is constructed of a solid-state camera having 256×256 CCDs arrayed in a matrix. Only the image which has entered the left light-incoming opening 36a (or the right light-incoming opening 36b) of the microscope 28 is inputted into the 256×256 CCDs constituting the first camera means 40. The image which has entered the right light-incoming opening 36b (or the left light-incoming opening 36a) of the microscope 28 is not inputted into the first camera means 40. In other words, the first optical channel 32 projects only the image which has entered either of the two light-incoming openings of the microscope 28, i.e. the left light-incoming opening 36a (or the right light-incoming opening 36b) to the 256×256 CCDs constituting the first camera means 40 at the relatively low magnification. On the other hand, in the 256×256 CCDs constituting the second camera means 42, the image which has entered the left light-incoming opening 36a of the microscope 28 is inputted into the 128×256 CCDs located on their left half portion, and the image which has entered the right light-incoming opening 36b of the microscope 28 is inputted into the remaining 128×256 CCDs located on their right half portion. In other words, the second optical channel 34 projects the image which has entered the left light-incoming opening 36a of the microscope 28 to the 128×256 CCDs located on the left half portion of the 256×256 CCDs constituting the second camera means 42 at the relatively high magnification and projects the image which has entered the right light-incoming opening 36b of the microscope 28 to the 128×256 CCDs located on the right half portion of the 256×256 CCDs constituting the second camera means 42 at the relatively high magnification. Each of the 256×256 CCDs produces an analog signal having a voltage corresponding to the gray level of a pixel inputted thereinto. Conveniently, an automatic gain adjusting means (not shown) known per se and capable of automatically adjusting the gain of an output analog signal according to the actual density of the image taken by the camera means is built in, or attached to, the solid-state camera having 256×256 CCDs.

With reference to FIG. 3, the first and second camera means 40 and 42 are connected to an A/D (analog/digital) converter means 46 through a magnification converter means 44, and the A/D converter means 46 is connected to an image frame memory 48. The magnification converter means 44 is controlled by a central processing unit (CPU) 50 which may be a microprocessor having a plurality of RAM built therein and electrically connects selectively either of the first and second camera means 40 and 42 to the A/D converter means 46. The A/D converter means 46 converts the input analog signals into multi-value digital signals which may, for example, be 8-bit digital signals (therefore, $2^8=256$ levels). The multi-value digital signals are fed to the image frame memory 48 and tentatively memorized there. The image frame memory 48 in the illustrated embodiment is comprised of RAM which has a storage capacity of at least 256×256×8 bits and therefore can memorize 256×256 eight-bit digital signals corresponding respectively to the densities of 256×256 pixels inputted into the 256×256 CCDs in the solid-state camera constituting each of the first and second camera means 40 and 42. Thus, the multi-value digital signals corresponding respectively to the image projected to the first camera means 40 at the relatively low magnification and the image projected to the second camera means 42 at the relatively high magnification of the surface of the wafer 2 held on the holding means 4 are selectively memorized in the image frame memory 48. If desired, the optical means 26 can be constructed of a microscope which can vary its magnification between a relatively low magnification and a relatively high magnification (in this case, the camera means 38 can be only one and the magnification converter means 44 can be omitted) and the multi-value digital signals corresponding respectively to the image at the relatively low magnification and the image at the relatively high magnification of the surface of the wafer 2 held on the holding means 4 can be selectively memorized in the image frame memory 48 by selectively varying the magnification of the microscope constituting the optical means 26.

In the illustrated embodiment, a display means 52 is also provided which is constructed conveniently of a cathode ray tube (CRT). The display means 52 visually displays selectively an image corresponding to the multivalue digital signal outputted by the A/D converter means 46, the signal stored in RAM in the central processing unit 50 or the signal stored in the key pattern memory to be described, according to the manual operation of a switching means (not shown). The illustrated display means 52 displays on its entire screen the image which has entered the left right-incoming opening 36a (or the right light-incoming opening 36b) of the microscope 28 in a total magnification of, for example, about 50 times when displaying the image projected to the first camera means 40, while the display means 52 displays at the left half portion of its screen the image which has entered the left light-incoming opening 36a of the microscope 28 and at the right half portion of its screen the image which has entered the right light-incoming opening 36b, each in a total magnification of, for example, about 260 times when displaying the image projected to the second camera means 42.

A key pattern memory 54 and a pattern matching means 56 are also connected to the central processing unit 50.

Figure 4:
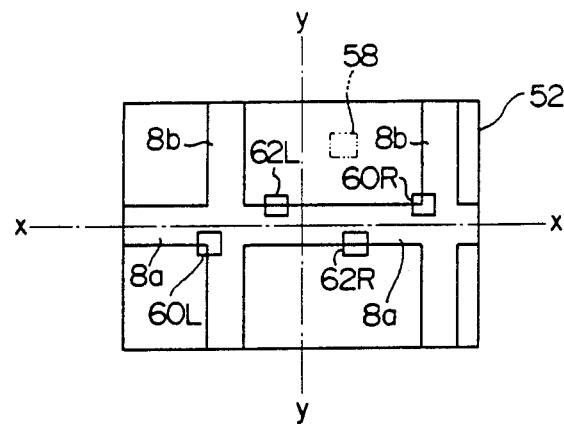
FIG. 4, FIG. 5 and FIG. 6 are simplified views illustrating the designated positions of specified areas and subsidiary specified areas in the image at a relatively high magnification and the image at a relatively low magnification of a sample wafer on a display panel of display means.

The key pattern memory 54 which may be constructed of RAM memorizes a signal showing the pattern of at least one specified area in the image of the surface of the wafer 2 projected to the first camera means 40 at the relatively low magnification, i.e. the low magnification key pattern and a signal showing the position of the low magnification key pattern, and a signal showing the pattern of at least one specified area in the image of the surface of the wafer 2 projected to the second camera means 42 at the relatively high magnification, i.e. the high magnification key pattern and a signal showing the position of the high magnification key pattern when the wafer 2 held on the holding means 4 is located at a predetermined position. One example of a method of inputting the signals to be memorized into the key pattern memory 54 is as follows: At first, the sample wafer 2 is placed on the holding means 4, and then the holding means 4 is moved by properly actuating the x-direction moving source 14, the y-direction moving source 16 and the θ-direction moving source 18 by hand, thereby positioning the sample wafer 2 on the holding means 4 at a required position with respect to the optical means 26. In performing this manual positioning, the second camera means 42 is connected to the A/D converter means 46 by controlling the magnification converter means 44 and the multi-value digital signals outputted by the A/D converter means 46 are visually displayed by the display means 52. Therefore, the magnified image of the surface of the sample wafer 2 at the relatively high magnification is visually displayed by the display means 52. An operator observes the image displayed on the display means 52 and thus positions the sample wafer 2 so that as schematically shown in FIG. 4, the center line of the straight-line area 8a in the surface of the sample wafer 2 substantially corresponds with the transverse center line of the displayed image on the display means 52, i.e. the x—x line.

Then, in each of the left half portion and the right half portion of the displayed image on the display means 52, cursors 58 are manually positioned respectively at specified areas 60L and 60R.

The cursors 58, and therefore the specified areas 60L and 60R designated by the cursors 58, may, for example, be in the form of a square having a size corresponding to 32×32 pixels (corresponding to 32×32 CCDs in the second camera means 42). The specified areas 60L and 60R designated by the cursors 58 are preferably areas having a marked characteristic, for example areas located at the crossing of the straight-line area 8a and the straight-line area 8b. The specified area 60L and the specified area 60R may have different patterns from each other or may have the same pattern. Then, those multi-value digital signals stored in the image frame memory 48 which correspond to 32×32=1024 pixels existing in the specified areas 60L and 60R are fed to, and stored in, the key pattern memory 54. Simultaneously, signals showing the positions (i.e., x- and y-coordinates) of the specified areas 60L and 60R in the image displayed on the display means 52 are also fed to, and stored in, the key pattern memory 54.

Thus, the key pattern memory 54 memorizes the multi-value digital signals showing the patterns of the specified areas 60L and 60R, i.e. the high magnification key patterns, and the x- and y-coordinate signals showing the positions of the high magnification key patterns.

In a preferred embodiment, an operation of memorizing high magnification subsidiary key patterns is carried out after the aforesaid operation of memorizing the high magnification key patterns. In the operation of memorizing the high magnification subsidiary key patterns, the cursors 58 are manually positioned at suitable areas, i.e. subsidiary specified areas 62L and 62R, which are different from the specified areas 60L and 60R, at the left half portion and the right half portion of the displayed image on the display means 52, respectively. Thereafter, as in the high magnification key pattern memorizing operation described above, multi-value digital signals showing the patterns of the subsidiary specified areas 62L and 62R, i.e. the high magnification subsidiary key patterns, are memorized in the key pattern memory 54. Furthermore, x- and y-coordinate signals showing the positions of the high magnification subsidiary key patterns (or signals showing the relative positions to the positions of the high magnification key patterns, i.e. the specified areas 60L and 60R) are stored in the key pattern memory 54.

Figure 5:
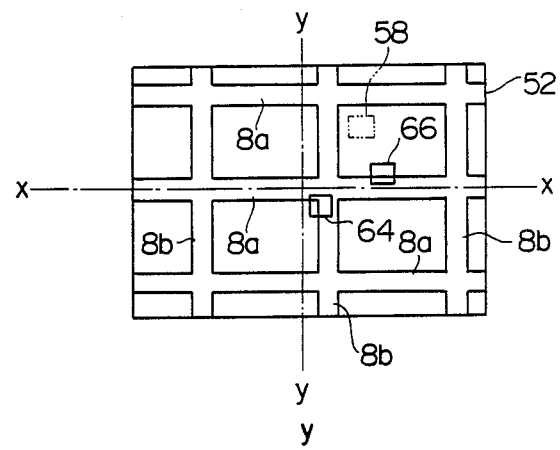

Then, the first camera means 40 is connected to the A/D converter means 46 by controlling the magnification converter means 44 and thus the image of the surface of the sample wafer 2 at the relatively low magnification is visually displayed on the display means 52 as schematically shown in FIG. 5. The cursor 58 is manually positioned at a specified area 64 in the displayed image on the display means 52. This specified area 64 may be one with the same center as the specified area 60L or 60R (FIG. 4) (therefore, a reduced image of the specified area 60L or 60R) or one with a different center. Then, those multi-value digital signals stored in the image frame memory 48 which corresponds to 32×32=1024 pixels existing in the specified area 64 (These pixels correspond to 32×32=1024 CCDs in the first camera means 40.) are fed to, and stored in, the key pattern memory 54. Simultaneously, signals showing the position (i.e. x- and y-coordinates) of the specified area 64 in the image displayed on the display means 52 are also fed to, and stored in, the key pattern memory 54. Thus, the key pattern memory 54 memorizes the multi-value digital signals showing the pattern of the specified area 64, i.e. the low magnification key pattern, and the x- and y-coordinate signals showing the position of the low magnification key pattern.

In a preferred embodiment, an operation of memorizing a low magnification subsidiary key pattern is carried out after the aforesaid operation of memorizing the low magnification key pattern. In the operation of memorizing the low magnification subsidiary key pattern, the cursor 58 is manually positioned at a suitable area, i.e. a subsidiary specified area 66, which is different from the specified area 64, in the displayed image on the display means 52. Thereafter, as in the low magnification key pattern memorizing operation described above, multi-value digital signals showing the pattern of the subsidiary specified area 66, i.e. the low magnification subsidiary key pattern, are memorized in the key pattern memory 54. Furthermore, x- and y-coordinate signals showing the position of the low magnification subsidiary key pattern (or signals showing the relative position to the position of the low magnification key pattern, i.e. the specified area 64) are stored in the key pattern memory 54.

Figure 6:
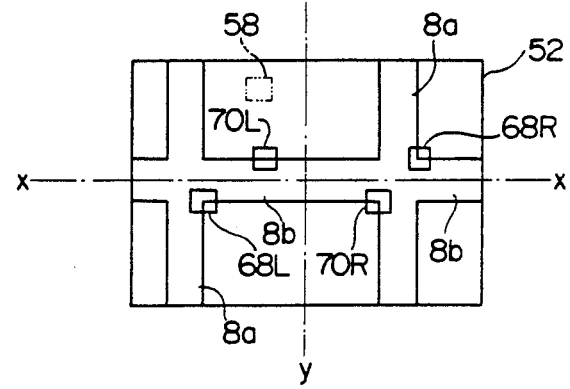

Moreover, after the aforesaid operations of storing the high magnification key patterns, the high magnification subsidiary key patterns, the low magnification key pattern and the low magnification subsidiary key pattern are over, it is desirable to carry out the following operations of storing high magnification key patterns and high magnification subsidiary key patterns. The $\theta$-direction moving source 18 is manually operated to rotate the holding means 4 and the sample wafer 2 held thereon through 90 degrees and the magnification converter means 44 is controlled to connect the second camera means 42 to the A/D converter means 46. Then, while observing the image displayed on the display means 52, i.e. the magnified image of the surface of the sample wafer 2 at the relatively high magnification, the operator positions the sample wafer 2 so that as schematically shown in FIG. 6, the center line of the straight-line area 8b in the surface of the sample wafer 2 substantially corresponds with the transverse center line of the displayed image on the display means 52, i.e. the x—x line, by properly actuating manually the x-direction moving source 14 and the y-direction moving source 16 as required. The same key pattern memorizing operation as the high magnification key pattern memorizing operation described above is carried out. Specifically, in the left half portion and the right half portion of the displayed image on the display means 52, the cursors 58 are positioned manually at specified areas 68L and 68R respectively, and multi-value digital signals showing the patterns of the specified areas 68L and 68R, i.e. the high magnification key patterns, are memorized in the key pattern memory 54. Furthermore, x- and y-coordinate signals showing the positions of the high magnification key patterns are memorized also in the key pattern memory 54. In addition, signals showing the amounts of movements in the x- and y-directions performed in order to position the sample wafer 2 in the state shown in FIG. 6 after its rotation through 90 degrees are memorized as rotating displacement signals in RAM built in the central processing unit 50 (or in the key pattern memory 54).

In a preferred embodiment, the same high magnification subsidiary key pattern memorizing operation as described above is performed after the high magnification key pattern memorizing operation. Specifically, in the left half portion and the right half portion of the displayed image on the display means 52, the cursors 58 are manually positioned at subsidiary specified areas 70L and 70R which are different from the specified areas 68L and 68R, and then multi-value digital signals showing the patterns of the subsidiary specified areas 70L and 70R, i.e. the high magnification subsidiary key patterns, are memorized in the key pattern memory 54, and x- and y-coordinate signals showing the positions of the high magnification subsidiary key patterns are also memorized in the key pattern memory 54.

Furthermore, if desired, the first camera means 40 can be connected to the A/D converter means 46 by controlling the magnification converter means 44 to thus visually display the image of the surface of the sample wafer 2 on the display means 52 at the relatively low magnification and the same operations as the low magnification key pattern and low magnification subsidiary key pattern memorizing operations described above can be carried out even after the sample wafer 2 has been rotated through 90 degrees.

Figure 7:
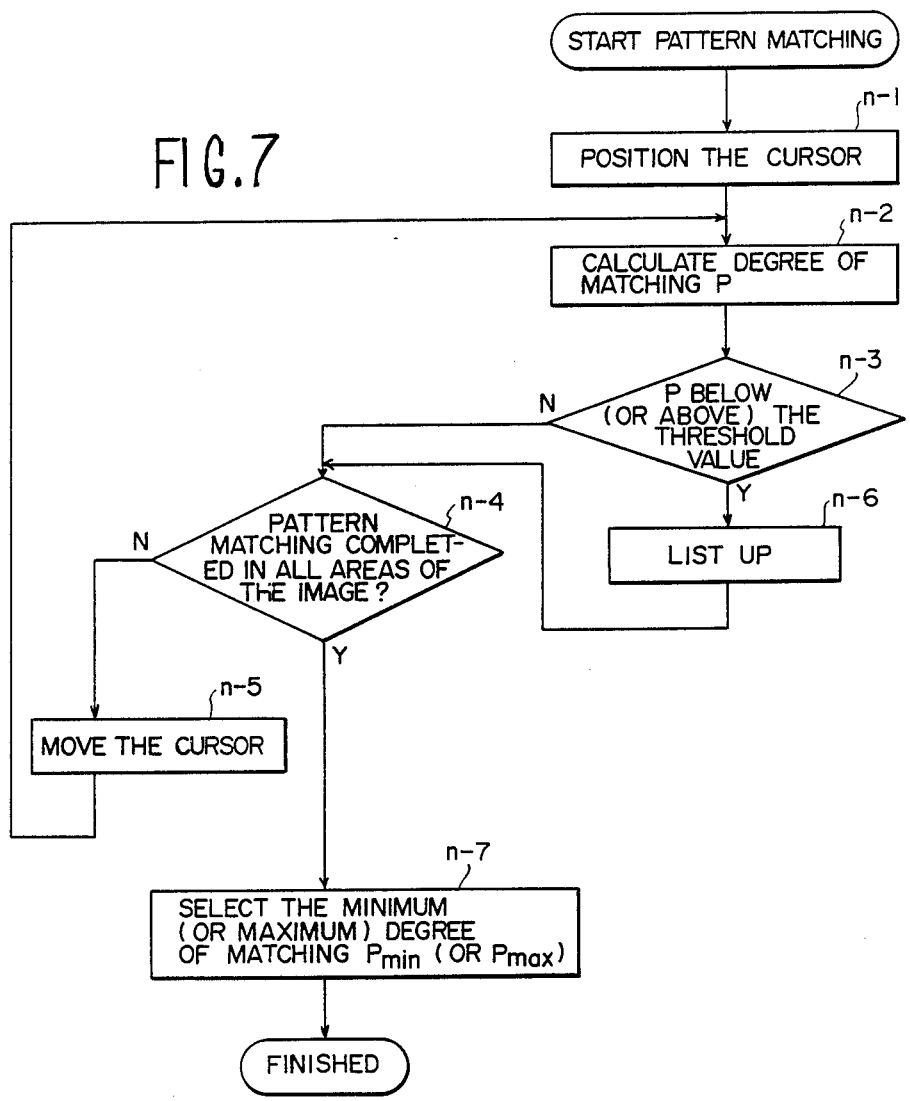
FIG. 7 is a flow chart showing one example of the pattern matching procedure by pattern matching means.

The pattern matching means 56 detects the same pattern as the low magnification key pattern or the low magnification subsidiary key pattern in the image, projected to the first camera means 40 at the relatively low magnification (low magnification pattern matching), and the same patterns as the high magnification key patterns or the high magnification subsidiary key patterns in the image, projected to the second camera means 42 at the relatively high magnification (high magnification pattern matching), on the surface of the wafer 2 held on the holding means 4 and adapted to be automatically positioned at a required position, and thus detects the relative position of the straight-line area 8a or 8b. One example of the detection by the pattern matching means 56 will be described below. With reference to the flow chart shown in FIG. 7, a description will be made of the case of detecting the same pattern as the pattern of the specified area 64, i.e. the low magnification key pattern in the image inputted from the left light-incoming opening 36a (or the right light-incoming opening 36b) of the microscope 28 in the optical means 26 and projected to the first camera means 40 through the first optical channel 32 at the relatively low magnification, i.e. in the image displayed on the entire screen of the display means 52 at the relatively low magnification. First, in step n-1, the cursor 58 is positioned at a specified site, for example the left top corner of the displayed image on the display means 52, thereby defining a collation area to be collated with the key pattern. Then, step n-2 sets in, and the degree of matching, P, between the collation area and the low magnification key pattern is calculated. The degree of matching, P, can be calculated on the basis of the multi-value digital signals showing the low magnification key pattern, i.e. 32×32 multi-value digital signals showing the densities of 32×32 pixels in the specified area 64, which are stored in the key pattern memory 54, and 32×32 multi-value digital signals showing the densities of 32×32 pixels in the collation area which are among those multi-value signals which have been inputted into the image frame memory 48 from the first camera means 40 via the A/D converter means 46. The degree of matching, P, itself can be calculated, for example, in accordance with the following equation A.

$$P = \sum_{i,j} |[f(i,j) - \bar{f}] - [g(i,j) - \bar{g}]| \qquad A$$

wherein f is a value corresponding to the density of each of 32×32 pixels in the collation area, $\bar{f}$ is an average of f values, g is a value corresponding to the density of each of 32×32 pixels in the low magnification key pattern, $\bar{g}$ is an average of g values, (i, j) show the row and column of each pixel, and therefore i=1–32, j=1–32. In this case, the smaller (i.e. the nearer to zero) the value of P is, the higher the degree of matching is. In the calculation of the degree of matching, P, in accordance with the equation A, the differences between the deviated values of the densities of the individual pixels in the collation area (i.e., the values obtained respectively by subtracting the average density value from the actual density values) and the deviated values of the densities of the individual pixels of the low magnification key pattern are added up. Accordingly, variations in a so-called density gain ascribable, for example, to variations in illuminance in the collation area are excluded, and a fully reliable degree of matching, P, can be obtained.

For simplification of the mathematical operation, the degree of matching, P, can also be calculated on the basis of the following equation $$P = \sum_{i,j} |U[f(i,j) - \bar{f}] - U[g(i,j) - \bar{g}]| \qquad B$$

wherein U means binarization, and U(x)=1 when x>0, and U(x)=0 when x≦0, which result from binarization of [f(i, j)−$\bar{f}$] and [g(i, j)−$\bar{g}$] in the above equation A. In this case, the smaller (i.e. the nearer to zero) the value of P is, the higher the degree of matching is, too.

To increase the reliability of the matching degree P further, the degree of matching, P, can also be obtained in accordance with the following equation $$P = \frac{\sum_{i,j} [f(i,j) - \bar{f}] \times [g(i,j) - \bar{g}]}{\sqrt{\sum_{i,j} [f(i,j) - \bar{f}]^2 \times \sum_{i,j} [g(i,j) - \bar{g}]^2}} \qquad C$$

wherein f, $\bar{f}$, g, $\bar{g}$ and (i, j) are the same as defined for equation A, on the basis of so-called normalizing correlation. In this case, the bigger (i.e. the nearer to one) the value of P is, the higher the degree of matching is.

In calculating the degree of matching, P, on the basis of equation A, B or C above, the correlation treatment may be carried out only on a plurality of specified pixels in the collation area, for example, only 32 specified pixels selected on the basis of one from each row and one from each column, instead of performing it on all of the pixels (32×32=1024) in the collation area, in order to increase the operating speed. In particular, it has been ascertained that when the degree of matching, P, is to be calculated on the basis of equation C, sufficient and good results can be obtained with regard to most semiconductor wafers even when the correlation treatment is carried out only on a plurality of specified pixels in the collation area.

After the calculation of the degree of matching, P, it is judged in step n-3 whether the calculated degree of matching, P, is below (or above) a predetermined threshold value. The predetermined threshold value may be properly set by the operator (for example, on a trial-and-error basis), and stored in the key pattern memory 54 or the RAM in the central processing unit 50. When the calculated degree of matching, P, is not below (or above) the predetermined threshold value (i.e., when the degree of matching is relatively low), step n-4 sets in, and it is determined whether the cursor 58 has been moved over the entire area of an image projected from the left light-incoming opening 36a (or the right light-incoming opening 36b) of the microscope 28 to the first camera means 40 through the first optical channel 32 at the relatively low magnification, namely an image displayed on the entire display panel of the display means 52 at the relatively low magnification. When the movement of the cursor 58 over the entire area of the aforesaid image has not yet been completed, step n-5 sets in, and the cursor 58 is moved by one pixel in the x-direction and/or y-direction to the next collation area. Thereafter, the degree of matching, P, is calculated in step n-2, and it is judged in step n-3 whether the calculated degree of matching, P, is below (or above) the predetermined threshold value. When the calculated degree of matching, P, is below (or above) the predetermined threshold value (i.e., when the degree of matching is relatively high), step n-3 is followed by step n-6 in which the position of the collation area and the degree of matching, P, are memorized in RAM built in the pattern matching means 56 or RAM built in the central processing unit 50 and listed up. Then, step n-4 sets in. When the degree of matching, P, has been calculated, and it has been judged whether the calculated degree of matching, P, is below (or above) the predetermined threshold value, over the entire area of the image projected from the left light-incoming opening 36a of the microscope 28 to the first camera means 40 through the first optical channel 32 at the relatively low magnification, namely the image displayed on the entire display panel of the display means 52 at the relatively low magnification, step n-4 is followed by step n-7 in which the smallest (or largest) of the degrees of matching, P, listed up in step n-6 is selected, and it is determined that a collation area which has the smallest (or largest) degree of matching, $P_{min}$ (or $P_{max}$), is the same as the low magnification key pattern, i.e., the specified area 64. Pattern detection in other cases can also be subject to substantially the same procedure as described above with reference to the flow chart shown in FIG. 7. In the pattern detection in the image at the relatively high magnification, however, pattern detection is carried out separately in each of an image projected from the left light-incoming opening 36a of the microscope 28 to the left half portion of the second camera means 42 and an image projected from the right light-incoming opening 36b of the microscope 28 to the right half portion of the second camera means 42.

The automatic accurate alignment system constructed in accordance with this invention also includes a movement control means 72 adapted to control the operation of the moving means 12, more specifically the x-direction moving source 14, the y-direction moving source 16 and the θ-direction moving source 18, and to position the wafer 2 held on the holding means 4 at a required position. The movement control means 72 actuates the moving means 12 on the basis of the low magnification pattern matching by the pattern matching means 56 with respect to the image at the relatively low magnification to thus primarily position the wafer 2, and thereafter actuates the moving means 12 on the basis of the high magnification pattern matching by the pattern matching means 56 with respect to the image at the relatively high magnification to thus secondarily position the wafer 2.

Figure 8:
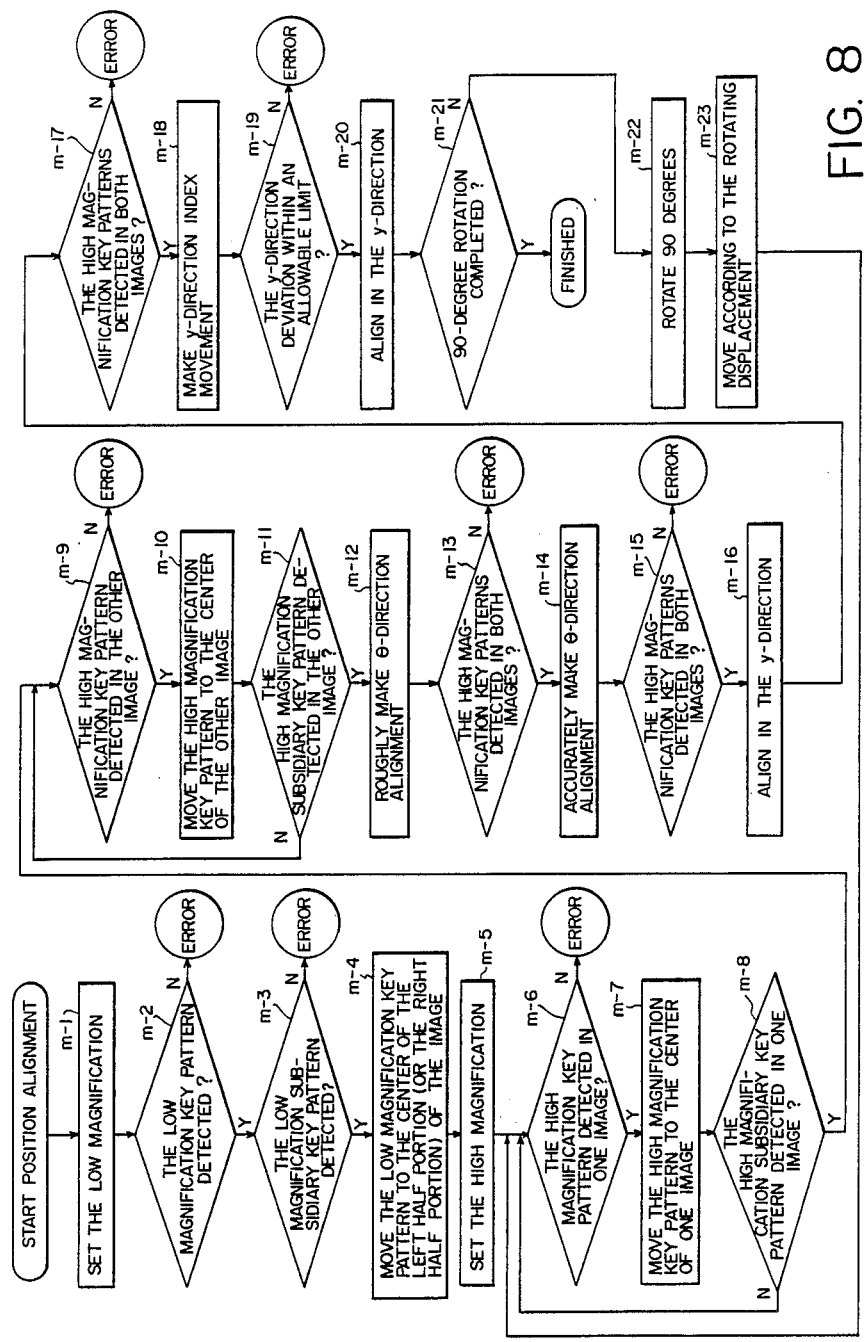
FIG. 8 is a flow chart showing one example of the alignment procedure.

FIG. 8 shows one example of a flow chart showing position alignment by the movement control means 72. With reference to FIG. 8, in step m-1, the magnification converter means 44 connects the first camera means 40 to the A/D converter means 46 and therefore the display means 52 is set up to visually display the image of the surface of the wafer 2 at the relatively low magnification. Then, it is judged in step m-2 whether the pattern matching means 56 detects the same pattern as the low magnification key pattern, i.e. the pattern of the specified area 64 (FIG. 5), in the image projected to the first camera means 40 at the relatively low magnification, i.e. the image projected from the left light-incoming opening 36a (or the right light-incoming opening 36b) of the microscope 28 to the first camera means 40 through the first optical channel 32 at the relatively low magnification. In the illustrated embodiment, the specified area 64 (FIG. 5) and the subsidiary specified area 66 (FIG. 5) necessarily exist in the image at the relatively low magnification in a normal state because of the placing operation within a required error limit of the wafer 2 onto the holding means 4 utilizing the orientation flat 6 in the wafer 2 (and, if necessary, an adjustment movement of the holding means 4 by actuating the moving means 12 carried out subsequently), and therefore the pattern matching means 56 necessarily detects the same pattern as the low magnification key pattern. Subsequently, step m-3 sets in and it is judged whether the pattern matching means 56 detects the same pattern as the low magnification subsidiary key pattern, i.e. the pattern of the subsidiary specified area 66, at a predetermined relative position to the same pattern as the low magnification key pattern detected in step m-2. In a normal state, the same pattern as the low magnification subsidiary key pattern is detected, and then step m-4 sets in. In step m-4, the x-direction moving source 14 and the y-direction moving source 16 of the moving means 12 are actuated to move the holding means 4 and the wafer 2 held thereon such that the center of the same pattern as the low magnification key pattern detected in step m-2 is the center of the left half portion (or the right half portion) of the displayed image on the display means 52. Thus, the specified area 60L (FIG. 4), in other words, the same pattern as the high magnification key pattern is caused to surely exist in one of the two images projected to the second camera means 42 at the relatively high magnification, i.e. the image projected from the left light-incoming opening 36a of the microscope 28 to the second camera means 42 through the second optical channel 34 at the relatively high magnification. Thus, the primary positioning is over and the secondary positioning is to be carried out. Specifically, in step m-5, the magnification converter means 44 connects the second camera means 42 to the A/D converter means 46 and therefore the display means 52 is set up to visually display the image of the surface of the wafer 2 at the relatively high magnification. Then, it is judged in step m-6 whether the pattern matching means 56 detects the same pattern as the high magnification key pattern, i.e. the pattern of the specified area 60L (FIG. 4), in one of the two images projected to the second camera means 42 at the relatively high magnification, i.e. the image projected from the left light-incoming opening 36a of the microscope 28 to the second camera means 42 through the second optical channel 34 at the relatively high magnification. In this high magnification pattern matching, the pattern matching means 56 can detect the same pattern as the high magnification key pattern sufficiently rapidly since step m-4 has already been carried out. Then, in step m-7, the x-direction moving source 14 and the y-direction moving source 16 of the moving means 12 are actuated to move the holding means 4 and the wafer 2 held thereon such that the center of the same pattern as the high magnification key pattern detected in step m-6 is the center of the left half portion of the displayed image on the display means 52. Subsequently, step m-8 sets in and it is judged whether the pattern matching means 56 detects the same pattern as the high magnification subsidiary key pattern, i.e. the pattern of the subsidiary specified area 62L (FIG. 4), at a predetermined relative position to the same pattern as the high magnification key pattern detected in step m-6. When the pattern matching means 56 does not detect the same pattern as the high magnification subsidiary key pattern, one returns to step m-6. When the pattern matching means 56 detects the same pattern as the high magnification subsidiary key pattern, step m-9 sets in. It is judged in step m-9 whether the pattern matching means 56 detects the same pattern as the high magnification key pattern, i.e. the pattern of the specified area 60R (FIG. 4), in the other of the two images projected to the second camera means 42 at the relatively high magnification, i.e. the image projected from the right light-incoming opening 36b of the microscope 28 to the second camera means 42 through the second optical channel 34 at the relatively high magnification. When the pattern matching means 56 detects the same pattern as the high magnification key pattern, step m-10 sets in. In step m-10, the x-direction moving source 14 and the y-direction moving source 16 of the moving means 12 are actuated to move the holding means 4 and the wafer 2 held thereon such that the center of the same pattern as the high magnification key pattern detected in step m-9 is the center of the right half portion of the displayed image on the display means 52. Subsequently, step m-11 sets in and it is judged whether the pattern matching means 56 detects the same pattern as the high magnification subsidiary key pattern, i.e. the pattern of the subsidiary specified area 62R (FIG. 4), at a predetermined relative position to the same pattern as the high magnification key pattern detected in step m-9. When the pattern matching means 56 does not detect the same pattern as the high magnification subsidiary key pattern, one returns to step m-9. When the pattern matching means 56 detects the same pattern as the high magnification subsidiary key pattern, step m-12 sets in. In step m-12, the pattern matching means 56 detects the same patterns as the high magnification key patterns, i.e. the patterns of the specified areas 60L and 60R (FIG. 4), in both of the two images projected to the second camera means 42 at the relatively high magnification, and the inclination angle of the straight-line area 8a to the transverse center line of the displayed image on the display means 52, i.e. the x—x line is calculated on the basis of the y-axis direction positions of the same patterns as the high magnification key patterns in the both images and according to this, the θ-direction moving source 18 of the moving means 12 is actuated to correct the above inclination (θ-direction rough alignment). Thereafter, step m-13 sets in and it is ascertained whether the pattern matching means 56 detects the same patterns as the high magnification key patterns, i.e. the patterns of the specified areas 60L and 60R (FIG. 4), in the both of the two images projected to the second camera means 42 at the relatively high magnification. Then, in step m-14, the inclination angle of the straight-line area 8a to the transverse center line of the displayed image on the display means 52, i.e. the x—x line is calculated on the basis of the y-axis direction positions of the same patterns as the high magnification key patterns in the both images and according to this, the θ-direction moving source 18 of the moving means 12 is actuated to correct the above inclination (θ-direction accurate alignment). Thereafter, step m-15 sets in and it is ascertained as in step m-13 whether the pattern matching means 56 detects the same patterns as the high magnification key patterns in both of the two images projected to the second camera means 42 at the relatively high magnification. Then, in step m-16, the y-axis direction deviation of the straight-line area 8a from the transverse center line of the displayed image on the display means 52, i.e. the x—x line is calculated on the basis of the y-axis direction positions of the same patterns as the high magnification key patterns and according to this, the y-direction moving source 16 of the moving means 12 is actuated to correct the above deviation, i.e. to cause the center of the straight-line area 8a to coincide with the transverse center line of the displayed image on the display means 52, i.e. the x—x line (y-direction alignment). Thereafter, step m-17 sets in and it is ascertained whether the pattern matching means 56 detects the same patterns as the high magnification key patterns in both of the two images projected to the camera means 42 at the relatively high magnification. Then, step m-18 sets in and the y-direction moving source 16 of the moving means 12 is actuated to move the holding means 4 and the wafer 2 held thereon by the index distance d+w (FIG. 2). (The index distance d+w can be memorized in RAM built in the central processing unit 50 beforehand.) Then, step m-19 sets in and it is ascertained whether the y-axis direction deviation of the straight-line area 8a from the transverse center line of the displayed image on the display means 52, i.e. the x—x line is within an allowable limit, on the basis of the y-axis direction positions of the same patterns as the high magnification key patterns detected by the pattern matching means 56 in both (or either) of the two images projected to the second camera means 42 at the relatively high magnification. Thereafter, step m-20 sets in and the deviation detected in step m-19 is corrected, i.e. the y-direction moving source 16 of the moving means 12 is actuated to cause the center of the straight-line area 8a to coincide with the transverse center line of the displayed image on the display means 52, i.e. the x—x line (y-direction alignment). Then, one goes to step m-21, and it is judged whether the holding means 4 and the wafer 2 thereon have been rotated through 90 degrees. When the 90-degree rotation has not yet been carried out, step m-22 sets in and the θ-direction moving source 18 of the moving means 12 is actuated to rotate the holding means 4 and the wafer 2 thereon through 90 degrees. Then, step m-23 sets in, and the x-direction moving source 14 and the y-direction moving source 16 of the moving means 12 are actuated to move the holding means 4 and the wafer 2 thereon in the x- and y-directions by amounts of movement corresponding to the aforesaid rotating displacement signal memorized in RAM in the central processing unit 50 (or the key pattern memory 54), i.e. to the amounts of x- and y-direction movements after the 90-degree rotation of the sample wafer 2 in the key pattern memorizing operation. Thus, it is ensured that the same patterns as the patterns of the specified areas 68L and 68R shown in FIG. 6, i.e. the high magnification key patterns (and the patterns of the subsidiary specified areas 70L and 70R, i.e. the high magnification subsidiary key patterns) exist in the two images projected to the second camera means 42 at the relatively high magnification. Thereafter, one goes back to step m-6. After returning to step m-6 via steps m-22 and m-23, it is judged in steps m-6, m-8, m-9, m-11, m-12, m-13, m-14, m-15, m-16, m-17, m-19 and m-20 whether the pattern matching means 56 detects the same patterns as the patterns of the specified areas 68L and/or 68R or the subsidiary specified areas 70L and/or 70R (FIG. 6) instead of the specified areas 60L and/or 60R or the subsidiary specified areas 62L and/or 62R (FIG. 4) in either or both of the two images projected to the second camera means 42 at the relatively high magnification. In steps m-12, m-14, m-16 and m-20, the inclination or the y-axis direction deviation of the straight-line area 8b instead of the straight line area 8a to or from the transverse center line of the displayed image on the display means 52, i.e. the x—x line is corrected.

The primary and secondary positionings are effected as described above, and consequently, the wafer 2 is positioned at a required position fully rapidly and fully accurately.

In the embodiment described above, the binocular microscope having the two light-incoming openings 36a and 36b spaced from each other a suitable distance in the x-direction is used as the microscope 28 in the optical means 26 and the two images are projected to the second camera means 42 at the relatively high magnification. If desired, however, a monocular microscope having a single light-incoming opening can be used as the microscope in the optical means 26 to thus project a single image to the second camera means 42 at the relatively high magnification. In this case, in the aforesaid step m-9, for example, the x-direction moving source 14 of the moving means 12 may be actuated to move the holding means 4 and the wafer 2 thereon in the x-direction by a predetermined distance and thereafter it is judged whether the pattern matching means 56 detects the same pattern as the high magnification key pattern in the image projected to the second camera means 42. In the aforesaid steps m-12 and m-14, for example, the θ-direction rough alignment and the θ-direction accurate alignment may be carried out on the basis of the y-axis direction positions of the same patterns as the high magnification key pattern in the two images projected to the second camera means 42 before and after the holding means 4 and the wafer 2 thereon are moved in the x-direction by the predetermined distance by actuating the x-direction moving source 14 of the moving means 12.

While the present invention has been described in detail hereinabove with reference to the accompanying drawings showing preferred embodiments of the automatic accurate alignment system, it should be understood that the invention is not limited to these preferred embodiments, and various changes and modifications are possible without departing from the scope of this invention.

What is claimed is:

1. An automatic accurate alignment system for positioning an object to be worked having a certain pattern on its surface at a required position, said system comprising:

holding means for holding the object to be worked,
moving means for moving the holding means,
optical means for projecting images of at least a part of the surface of the object held on the holding means at two magnifications, one of said magnifications being a relatively low magnification and the other being a relatively high magnification, the optical means including a microscope having a first light-receiving opening spaced apart from a second light receiving opening and optical channel means for projecting light received through one of the openings to provide a low magnification image and light received through both of the openings to provide high magnification images,
camera means receiving at least a part of the images of the surface of the object held on the holding means from the optical means and providing analog signals indicative of the densities of x-y matrix arrayed pixels,
an image frame memory for memorizing signals corresponding to the analog signals provided by the camera means,
a key pattern memory for memorizing a first signal representing a low magnification key pattern existing at a specified area in the image projected to the camera means at the relatively low magnification, a second signal indicating the position of the low magnification key pattern, a third signal representing a high magnification key pattern existing at a specified area in the images projected to the camera means at the relatively high magnification, and a fourth signal indicating the position of the high magnification key pattern when the object to be worked is located at a predetermined position,
pattern matching means for performing low magnification pattern matching to detect the same pattern as the low magnification key pattern in the image projected to the camera means at the relatively low magnification and high magnification pattern matching to detect the same pattern as the high magnification key pattern in the images projected to the camera means at the relatively high magnification, the pattern matching means performing the pattern matchings based upon the signals stored in the image frame memory and the signals stored in the key pattern memory, and
movement control means for primarily positioning the object held on the holding means by actuating the moving means in response to the low magnification pattern matching performed by the pattern matching means, and thereafter secondarily positioning the object held on the holding means by actuating the moving means in response to the high magnification pattern matching performed by the pattern matching means.

2. The system of claim 1 wherein the optical channel means has a first optical channel for projecting light received through said one of the openings and a second optical channel for projecting light received through both of the openings, and
the camera means has a first camera optically connected to the first optical channel, a second camera optically connected to the second optical channel, and a magnification converter means for selectively electrically connecting the first camera and the second camera to the image frame memory.

3. The system of claim 1 wherein
the camera means includes an A/D converter means for converting analog signals provided by the camera means to multi-value digital signals, and
the image frame memory memorizes the multi-value digital signals generated by the A/D converter means.

4. The system of claim 3 wherein the signals representing the low magnification key pattern and the high magnification key pattern stored in the key pattern memory are multi-value digital signals indicative of the densities of a plurality of pixels in the low magnification key pattern and the high magnification key pattern.

5. The system of claim 4 wherein the pattern matching means calculates the degree of matching, P, in the low magnification pattern matching and the high magnification pattern matching on the basis of the following equation $$P = \sum_{i,j} |[f(i,j) - \bar{f}] - [g(i,j) - \bar{g}]|$$

wherein f is a value corresponding to the density of each of a plurality of pixels in a collation area on the surface of the object held on the holding means, $\bar{f}$ is an average of f values, g is a value corresponding to the density of each of a plurality of pixels in the key pattern, and $\bar{g}$ is an average of g values.

6. The system of claim 4 wherein the pattern matching means calculates the degree of matching, P, in the low magnification pattern matching and the high magnification pattern matching on the basis of the following equation $$P = \sum_{i,j} |U[f(i,j) - \bar{f}] - U[g(i,j) - \bar{g}]|$$

wherein f is a value corresponding to the density of each of a plurality of pixels in a collation area on the surface of the object held on the holding means, $\bar{f}$ is an average of f values, g is a value corresponding to the density of each of a plurality of pixels in the key pattern, $\bar{g}$ is an average of g values, and $U(x) = 1$ when $x > 0$ and $U(x) = 0$ when $x \leq 0$.

7. The system of claim 4 wherein the pattern matching means calculates the degree of matching, P, in the low magnification pattern matching and the high magnification pattern matching on the basis of the following equation $$P = \frac{\sum_{i,j} [f(i,j) - \bar{f}] \times [g(i,j) - \bar{g}]}{\sqrt{\sum_{i,j} [f(i,j) - \bar{f}]^2 \times \sum_{i,j} [g(i,j) - \bar{g}]^2}}$$

wherein f is a value corresponding to the density of each of a plurality of pixels in a collation area on the surface of the object held on the holding means, $\bar{f}$ is an average of f values, g is a value corresponding to the density of each of a plurality of pixels in the key pattern, and $\bar{g}$ is an average of g values.

8. The system of claim 1 wherein the key pattern memory memorizes a signal representative of at least one first high magnification key pattern corresponding to a specified area in the images projected to the camera means at the relatively high magnification and a signal indicative of the position of the first high magnification key pattern when the object to be worked is at a first predetermined position, and a signal representative of at least one second high magnification key pattern corresponding to a specified area in the images projected to the camera means at the relatively high magnification and a signal indicative of the position of the second high magnification key pattern when the object to be worked is at a second predetermined position by being rotated through 90 degrees with respect to the first predetermined position, and in the secondary positioning, the movement control means performs positioning with regard to the first predetermined position, then rotates the holding means through 90 degrees, and thereafter performs positioning with regard to the second predetermined position.

9. The system of claim 1 wherein the camera means comprises a solid-state camera having a plurality of image sensor elements arrayed in an x-y matrix.

10. The system of claim 1 wherein the object to be worked is a semiconductor wafer having a plurality of straight-line areas arranged in a lattice pattern on its surface and a circuit pattern applied to each of a plurality of rectangular areas defined by the straight-line areas.

* * * * *